United States Patent Office 3,092,657
Patented June 4, 1963

3,092,657
VITAMIN A ESTER
Albert J. Forlano, Brooklyn, N.Y., assignor to Chas. Pfizer & Co., Inc., New York, N.Y., a corporation of Delaware
No Drawing. Filed May 17, 1961, Ser. No. 110,658
1 Claim. (Cl. 260—488)

This invention relates to a new and useful organic ester in the vitamin A series. More particularly, it is concerned with a novel vitamin A lower fatty acid ester which is especially valuable in view of its excellent stability toward acid as well as to such conditions as heat, light, air oxidation, and so forth.

In the past, vitamin A (the alcohol) was traditionally obtained from such sources as fish liver oils and the like, and it was offered to the pharmaceutical industry generally in the form of concentrates which often possessed undesirable characteristics. Among the typical problems which they presented were impurities and especially, an inconsistency with respect to stability. The first problem was solved by the synthesis of crystalline vitamin A acetate, but to this date there has never been any satisfactory solution of the stability problem without resort to the use of higher fatty acid esters of vitamin A, such as the palmitate, which are derived from the aforementioned acetate as the ideal starting material. Nevertheless, vitamin A palmitate is not completely impervious to heat and light (or, for that matter, acid) and it usually is desirable to store it in a cool place, preferably under refrigeration, in a closed container under a nitrogen atmosphere. Furthermore, it is also necessary to store it in such a way that it will always be protected from lengthy exposure to strong sunlight when kept at room temperature.

In accordance with the present invention, there has now been provided for the first time a new lower fatty acid ester of vitamin A which circumvents all the aforementioned difficulties incumbent upon the prior art. This particularly useful and valuable novel ester is vitamin A α-methyl-α-ethylcaproate. As previously indicated, it is especially noted that the novel ester of this invention is particularly outstanding with respect to its stability toward acid, heat, light and air oxidation, in addition to being very stable toward base and neutral organic solvents as well as water. Thus, for example, vitamin A α-methyl-α-ethylcaproate has been found to be at least six times as stable as vitamin A palmitate in alcoholic 0.01 N HCl as revealed by a determination of their respective first order reaction rate constants via conventional kinetic methods.

In accordance with the procedure employed for the preparation of this compound, vitamin A alcohol is reacted with α-methyl-α-ethylcaproyl chloride. This reaction is ordinarily conducted at or near room temperature, although any temperature in the range of from about 0° C. up to about 45° C. is most satisfactory for these purposes. In general, it is only necessary that substantially equimolar proportions of the vitamin A alcohol and the acid chloride be employed since the reaction takes place on a 1:1 molar basis. However, in practice, it is also usually more advantageous to carry out the reaction in an inert organic solvent, i.e., one which will dissolve both reactants without undergoing any change in its own chemical composition, like methylene chloride, ethylene dichloride, chloroform, trichloroethylene, carbon tetrachloride, s-tetrachloroethane, diethyl ether, diisopropyl ether, dioxane, and so forth. In this connection, it should also be pointed out that the reaction between vitamin A alcohol and α-methyl-α-ethylcaproyl chloride is greatly facilitated by the use of an acid acceptor in conjunction therewith. Such acid acceptors are preferably tertiary organic amines such as triethylamine, tri-isopropylamine, tri-n-butylamine, 1-ethylpiperidine, 1-methylpyrrolidine, 4-ethylmorpholine, 1,4-dimethylpiperazine, pyridine, picoline, lutidine, collidine, quinoline, isoquinoline, and the like, although it is also possible to employ various inorganic bases such as the alkali metal hydroxides.

As previously indicated, the novel vitamin A ester of this invention, viz., vitamin A α-methyl-α-ethylcaproate, is characterized by a remarkably high degree of stability toward acid as evidenced by its extremely slow rate of change to anhydrovitamin A under these conditions, based on standard spectrophotometric determinations in accordance with the official U.S.P. assay method. Additionally, the biological assay value for this ester does not change appreciably to any considerable extent under these same conditions. Hence, such a product readily lends itself to use as a convenient source of vitamin A in various animal feed dietary supplements and multivitamin preparations, in place of the other vitamin A esters that have previously been described and utilized on an equal basis. Needless to say, the present compositions possess a distinct advantage over those of the prior art in view of what has already been discussed.

This invention is further illustrated by the following example, which is not to be construed in any way as imposing limitations upon the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

*Example 1*

A solution consisting of 130 g. (0.453 mole) of vitamin A alcohol dissolved in 400 ml. of ethylene dichloride is treated with 125 ml. of pyridine at room temperature (25° C.). The resulting solution is then cooled to 10° C. and placed under a nitrogen atmosphere while 90 g. (0.570 mole) of α-methyl-α-ethylcaproyl chloride dissolved in 100 ml. of ethylene dichloride is slowly added thereto in a dropwise manner with constant agitation being maintained throughout this step. The reaction mixture is then allowed to stand in the dark at room temperature for approximately two hours (still under the nitrogen atmosphere). At the end of this period, it is transferred to a separatory funnel containing 0.1 N HCl and washed thusly until the wash liquid remains acidic. The organic layer is then treated with distilled water to remove the excess acid and subsequently dried over anhydrous sodium sulfate. After removal of the drying agent by means of filtration, the ethylene dichloride solution is passed through a column of deactivated alumina (8%), which is prepared by making a slurry of said alumina in petroleum ether and forming the column therefrom. In this manner, a large fraction of material is collected which appears to have a yellow color upon exposure to ultraviolet light. This material is then subsequently concentrated to dryness under reduced pressure, and the residue thus obtained is dissolved in petroleum ether and passed through a column containing 6% deactivated alumina prepared in the same manner as before except for the amount of alumina employed. Upon completion of this step, a zone of anhydrovitamin A is eluted from the column with petroleum ether, while a larger zone of material exhibiting a yellow-green color under ultraviolet light is eluted with a chloroform-petroleum ether solution (1:3 by volume, respectively). The latter fraction is subsequently evaporated to dryness under reduced pressure to afford pure vitamin A α-methyl-α-ethylcaproate having the following characteristic properties:

$$\lambda_{Max.}^{Pet.\ ether}\ 327\ m\mu\ (E_{1cm.}^{1\%} = 1181)$$

When this ester is compared with vitamin A palmitate with respect to anhydrovitamin A formation in accordance with the procedure described by E. M. Shantz et al., in the Journal of the American Chemical Society, vol. 65, p. 901 (1943), the following first order reaction rate constants are obtained based on tests conducted in three different solvent media as shown below in the following table:

| Medium | First Order Rate Constants×2.303$^{-1}$ | |
|---|---|---|
| | Vitamin A Palmitate | Vitamin A α-Methyl-α-ethylcaproate |
| 70% Aqueous ethanol | 12.5×10$^{-4}$ hr.$^{-1}$ | 2.7×10$^{-4}$ hr.$^{-1}$ |
| 0.01 N HCl in abs. ethanol | 21.2×10$^{-4}$ hr.$^{-1}$ | 3.4×10$^{-4}$ hr.$^{-1}$ |
| 0.1 N HCl in 95% ethanol | 19.4×10$^{-4}$ hr.$^{-1}$ | 5.0×10$^{-4}$ hr.$^{-1}$ |

What is claimed is:
Vitamin A α-methyl-α-ethyl-caproate.

References Cited in the file of this patent
UNITED STATES PATENTS

| | | |
|---|---|---|
| 2,169,195 | Hickman et al. | Aug. 8, 1939 |
| 2,229,173 | Hickman | Jan. 21, 1941 |
| 2,848,466 | Fletcher | Aug. 19, 1958 |

OTHER REFERENCES

Chemical Abstracts, vol. 49, 8122d, 1955.